United States Patent
Chun

(10) Patent No.: US 10,810,891 B2
(45) Date of Patent: Oct. 20, 2020

(54) UNMANNED AERIAL VEHICLE AND SYSTEM HAVING THE SAME AND METHOD FOR SEARCHING FOR ROUTE OF UNMANNED AERIAL VEHICLE

(71) Applicants: HYUNDAI MOTOR COMPANY, Seoul (KR); KIA MOTORS CORPORATION, Seoul (KR)

(72) Inventor: Chang Woo Chun, Anyang-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 183 days.

(21) Appl. No.: 16/126,149

(22) Filed: Sep. 10, 2018

(65) Prior Publication Data
US 2019/0244530 A1 Aug. 8, 2019

(30) Foreign Application Priority Data
Feb. 8, 2018 (KR) ........................ 10-2018-0015408

(51) Int. Cl.
| | |
|---|---|
| G08G 5/06 | (2006.01) |
| G05D 1/04 | (2006.01) |
| G08G 5/00 | (2006.01) |
| B64C 39/02 | (2006.01) |
| G05D 1/00 | (2006.01) |
| G01C 21/00 | (2006.01) |
| G05D 1/10 | (2006.01) |

(52) U.S. Cl.
CPC ......... *G08G 5/0069* (2013.01); *B64C 39/024* (2013.01); *G01C 21/00* (2013.01); *G05D 1/0011* (2013.01); *G05D 1/0088* (2013.01); *G05D 1/042* (2013.01); *G05D 1/101* (2013.01); *G08G 5/006* (2013.01); *G08G 5/0013* (2013.01); *G08G 5/0026* (2013.01); *G08G 5/0034* (2013.01); *B64C 2201/024* (2013.01); *B64C 2201/141* (2013.01); *B64C 2201/208* (2013.01)

(58) Field of Classification Search
CPC ........ B64C 2201/024; B64C 2201/141; B64C 2201/208; B64C 9/024; G01C 21/00; G01C 21/20; G05D 1/0011; G05D 1/0088; G05D 1/042; G05D 1/101; G08G 5/0013; G08G 5/0026; G08G 5/0034; G08G 5/006; G08G 5/0069
See application file for complete search history.

(56) References Cited

U.S. PATENT DOCUMENTS

| | | | |
|---|---|---|---|
| 9,056,676 B1* | 6/2015 | Wang | B64F 1/00 |
| 9,384,668 B2* | 7/2016 | Raptopoulos | H04B 7/18506 |
| 9,481,475 B2* | 11/2016 | Campillo | G05D 1/0011 |
| 9,619,776 B1* | 4/2017 | Ford | G06Q 10/08355 |
| 9,704,409 B2* | 7/2017 | Prakash | B64C 39/024 |
| 9,984,347 B2* | 5/2018 | Dreano, Jr. | G06Q 30/0635 |
| 10,287,014 B2* | 5/2019 | Erickson | B64C 39/024 |

(Continued)

*Primary Examiner* — Tyler J Lee
(74) *Attorney, Agent, or Firm* — Morgan, Lewis & Bockius LLP

(57) ABSTRACT

A route searching system includes: an unmanned aerial vehicle; and a control center configured to search for a shortest route based on information on a departure point and a destination received from the unmanned aerial vehicle, and configured to select a final route based on a first similarity between the shortest route and a vehicle riding route.

19 Claims, 7 Drawing Sheets

(56) References Cited

U.S. PATENT DOCUMENTS

| | | | |
|---|---|---|---|
| 2015/0370251 A1* | 12/2015 | Siegel | G05D 1/0684 701/2 |
| 2016/0196756 A1* | 7/2016 | Prakash | G08G 5/025 701/3 |
| 2016/0207637 A1* | 7/2016 | Campillo | B64C 39/024 |
| 2016/0257401 A1* | 9/2016 | Buchmueller | G01C 21/343 |
| 2017/0139424 A1* | 5/2017 | Li | G06Q 10/083 |
| 2017/0160735 A1* | 6/2017 | Mikan | G08G 5/0034 |
| 2019/0012636 A1* | 1/2019 | Simon | G08G 5/0013 |
| 2019/0043370 A1* | 2/2019 | Mulhall | B64D 1/08 |
| 2019/0103032 A1* | 4/2019 | Sasaki | G01C 21/20 |
| 2019/0295426 A1* | 9/2019 | Nilsson | G08G 5/0043 |

* cited by examiner

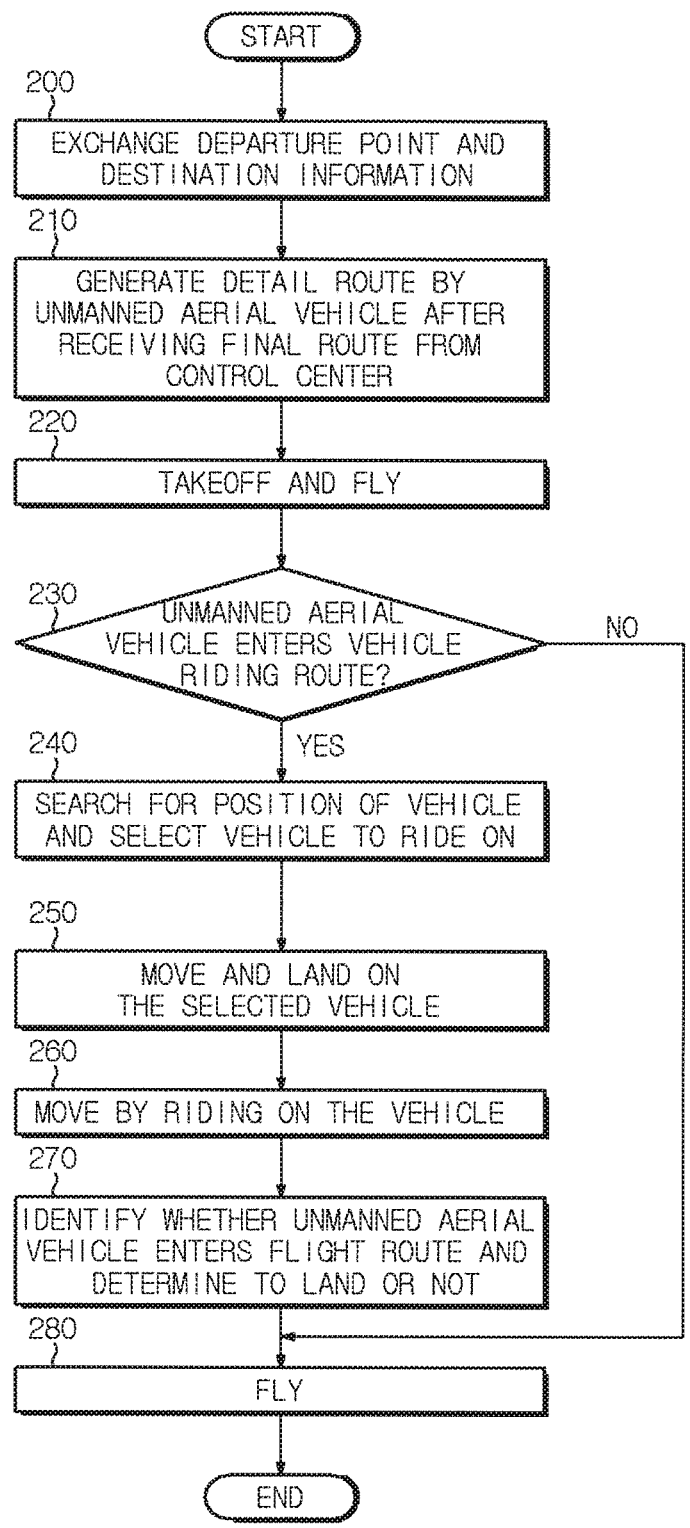

UNMANNED AERIAL VEHICLE AND SYSTEM HAVING THE SAME AND METHOD FOR SEARCHING FOR ROUTE OF UNMANNED AERIAL VEHICLE

CROSS-REFERENCE TO RELATED APPLICATION(S)

This application is based on and claims priority under 35 U.S.C. § 119 to Korean Patent Application No. 10-2018-0015408, filed on Feb. 8, 2018, in the Korean Intellectual Property Office, the disclosure of which is incorporated by reference herein in its entirety.

TECHNICAL FIELD

The present disclosure relates to an unmanned aerial vehicle configured to search for an optimal route, a system having the same, and a method for searching for a route of the unmanned aerial vehicle.

BACKGROUND

An unmanned aerial vehicle capable of flying and recording an image has been developed and supplied. In general, the unmanned aerial vehicle that can be flied and controlled by the induction of radio waves with a rotary wing is referred to as a drone.

Drones are used in various fields such as performing a variety of functions, e.g., high altitude recording and delivery. However, as for the drones, a flight distance is limited due to the limited capacity of their batteries, and a fly zone is also restricted by flight regulations.

SUMMARY

An aspect of the present disclosure provides an unmanned aerial vehicle capable of increasing a short travel distance caused by limitation in a battery capacity, inducing a safe flight and scheduling a plurality of unmanned aerial vehicles, by searching for an optimal route to a destination, a system having the same and a method for searching for a route of the unmanned aerial vehicle Additional aspects of the present disclosure will be set forth in part in the description which follows and, in part, will be obvious from the description, or may be learned by practice of the present disclosure.

In accordance with an aspect of the disclosure, a route searching system includes: an unmanned aerial vehicle; and a control center configured to search for a shortest route based on information on a departure point and a destination received from the unmanned aerial vehicle, and configured to select a final route based on a first similarity between the shortest route and a vehicle riding route.

The unmanned aerial vehicle may receive the final route through a communication with the control center and land on a vehicle placed on the vehicle riding route contained in the final route to move along with the vehicle.

The control center may identify whether a flight restricted zone is present in the shortest route, and search for a first route that bypasses the flight restricted zone.

The control center may search for a second route including the vehicle riding route and select a plurality of candidate routes based on a similarity between the first route and the second route.

The control center may select a final route from the selected plurality of candidate routes, based on a travel time to the destination and an amount of battery consumption to the destination.

The control center may calculate the travel time to the destination, based on an additional time for landing on or taking off from the vehicle and a vehicle riding time for moving by riding on the vehicle.

The control center may calculate the amount of battery consumption to the destination, based on an amount of battery consumption for landing on or taking off from the vehicle and an amount of battery consumption for flight of the unmanned aerial vehicle.

The similarity may include cosine similarity between routes corresponding to comparisons, or Arg MIN function based on the sum of distance of route.

The number of the candidate routes may be calculated by the heuristic method.

In accordance with another aspect of the disclosure, a method for searching for a route of an unmanned aerial vehicle includes: searching for a shortest route based on information on a departure point and a destination; selecting a final route based on a first similarity between the shortest route and a vehicle riding route; and landing on a vehicle placed on a vehicle riding route contained in the selected final route and moving together with the vehicle.

The method may further include identifying whether a flight restricted zone is present in the shortest route; and searching for a first route that bypasses the flight restricted zone.

The method may further include searching for a second route including the vehicle riding route; and selecting a plurality of candidate routes based on a similarity between the first route and the second route.

The selection may include selecting a final route from the selected plurality of candidate routes, based on a travel time to the destination and an amount of battery consumption to the destination.

The method may further include calculating the travel time to the destination, based on an additional time for landing on or taking off from the vehicle and a vehicle riding time for moving by riding on the vehicle.

The method may further include calculating the amount of battery consumption to the destination, based on an amount of battery consumption for landing on or taking off from the vehicle and an amount of battery consumption for flight of the unmanned aerial vehicle.

The similarity may include cosine similarity between routes corresponding to comparisons, or Arg MIN function based on the sum of distance of route.

The selection of the plurality of candidate routes may include calculating the number of the candidate routes by the heuristic method.

In accordance with another aspect of the disclosure, an unmanned aerial vehicle includes: a battery; a flight portion configured to use power of the battery; a communicator configured to perform a communication with a control center; and a controller configured to receive information on a departure point and a destination from the control center through the communicator and configured to control the flight portion to allow the unmanned aerial vehicle to land on a vehicle placed on a vehicle riding route contained in a final route received from the control center.

The unmanned aerial vehicle may further include a sensor configured to collect information related to the surroundings, wherein the controller may select a detail route based on information collected by the sensor and the final route.

The controller may control the flight portion to allow the unmanned aerial vehicle to land on the vehicle by identifying whether the unmanned aerial vehicle enters the vehicle riding route.

The controller may control the flight portion to allow the unmanned aerial vehicle to take off from the vehicle by identifying whether the unmanned aerial vehicle enters a flight route contained in the final route.

BRIEF DESCRIPTION OF THE DRAWINGS

These and/or other aspects of the disclosure will become apparent and more readily appreciated from the following description of embodiments, taken in conjunction with the accompanying drawings of which:

FIG. 7 is a flowchart illustrating a method in which the unmanned aerial vehicle according to an embodiment moves to a destination through a final route.

DETAILED DESCRIPTION

Figure 1:
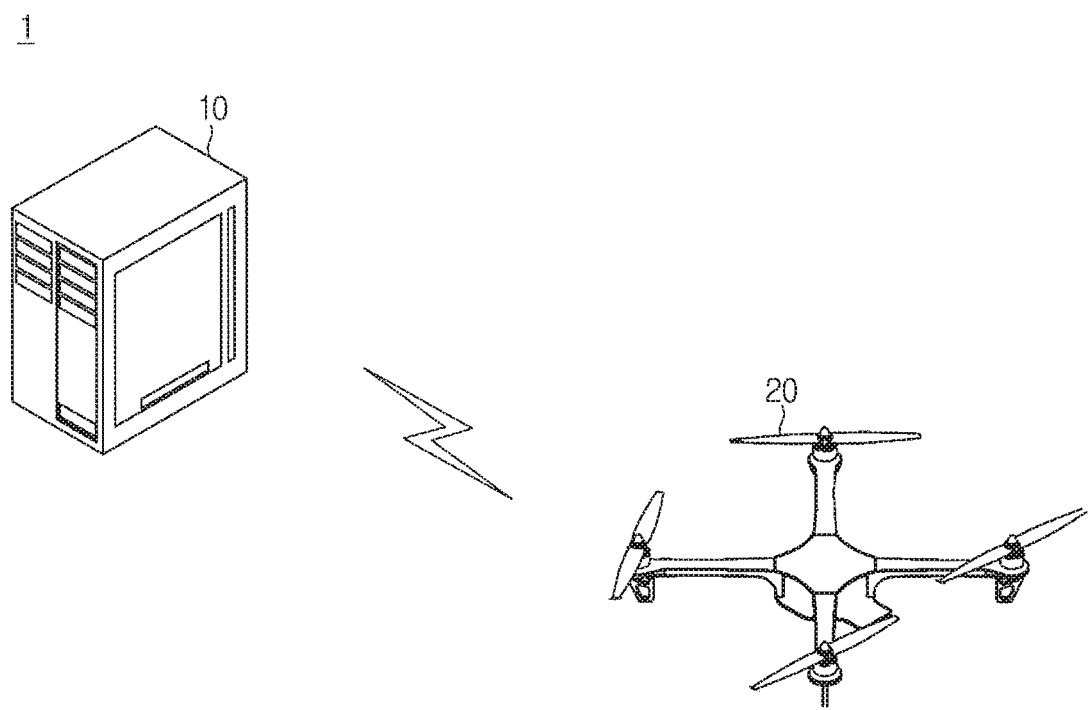
FIG. 1 is a diagram illustrating a system having an unmanned aerial vehicle according to an embodiment.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

When a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the present disclosure, examples of which are illustrated in the accompanying drawings.

Figure 2:
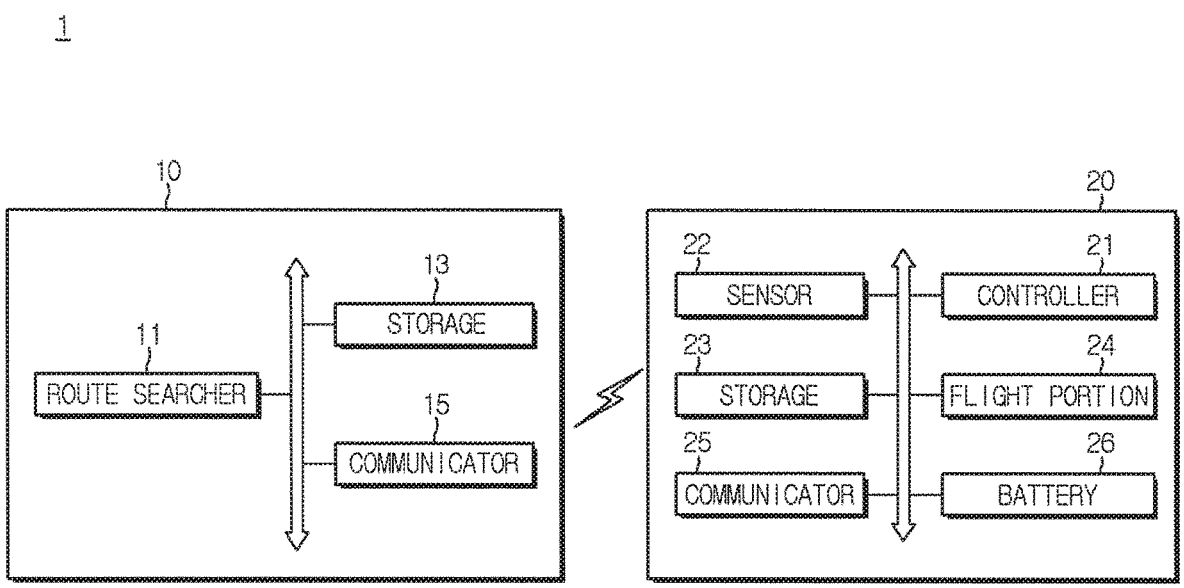
FIG. 2 is a control block diagram illustrating the unmanned aerial vehicle and a control center.

FIG. 1 is a diagram illustrating a system having an unmanned aerial vehicle according to an embodiment, and FIG. 2 is a control block diagram illustrating the unmanned aerial vehicle and a control center. To avoid duplicate description, a description thereof will be described together.

The disclosed system 1 may include an unmanned aerial vehicle (UAV) 20 and a control center 10 configured to communicate with the UAV 20.

The disclosed UAV 20 may include a sensor 22 configured to obtain information related to the surroundings of the UAV 20, a storage 23 configured to store a route and a variety of data, a flight portion 24 configured to execute a takeoff, a flight, an attitude control, and a landing, a battery 26 configured to supply power to each components including the flight portion 24, a communicator 25 configured to communicate with the control center 10 or a vehicle 30, and a controller 21 configured to control the above-mentioned components.

Particularly, the sensor 22 may include a variety of sensors configured to detect the surroundings of the UAV 20 and states of the UAV 20, and configured to acquire information related to the movement of the UAV 20.

For example, the sensor 22 may include an image sensor for imaging the surroundings, a radar sensor or an ultrasonic sensor for detecting adjacent objects on a route, a gyro sensor for an attitude control, and an acceleration sensor or an angular speed sensor for the movement.

The UAV 20 may further include a GPS sensor configured to identify its position on a route.

The flight portion 24 may include a variety of devices for the flight of the UAV 20. For example, the UAV 20 may be implemented in the form of multi-copters such as dual-copters, tri-copters, quad-copters or octo-copters, to perform a vertical takeoff and landing, and flight by having a rotary wing.

The flight portion 24 includes both a hardware device according to each type and a software device for control.

Each component of the flight portion 24 and the UAV 20 is operated by receiving power from the battery 26. The battery 26 is provided in the UAV 20 so that the UAV 20 can receive power even during the flight.

The battery 26 may transmit information related to a remaining charge amount to the controller 21 and the controller 21 may transmit information related to the capacity of the battery 26 including the remaining charge amount, to the control center 10 through the communicator 25.

The communicator 25 is a hardware device and may include a communication module configured to communicate with the control center 10 or the vehicle 30. For example, the communicator 25 may include a wireless communication module, and additionally include a short range communication module or a wired communication module.

The wireless communication module may include a wireless communication module supporting a variety of wireless communication methods, e.g., Wifi module, Wireless broadband module, global System for Mobile (GSM) Communication, Code Division Multiple Access (CDMA), Wideband Code Division Multiple Access (WCDMA), Time Division Multiple Access (TDMA), and Long Term Evolution (LTE).

The wireless communication module may include a wireless communication interface provided with a communication port connecting the network to the controller 21, a transmitter transmitting information related to the conditions and flight conditions of the UAV 20 and a receiver receiving information from the control center 10, other unmanned aerial vehicle 20, or the vehicle 30. The wireless communication module may further include a signal conversion module configured to modulate a digital control signal output from the controller 21 via the wireless communication interface, into a radio signal in the analog form, and configured to demodulate the radio signal in the analog form, which is received via the wireless communication interface, into a digital control signal, under the control of the controller 21.

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC module, and ZigBee communication module.

The wired communication module may include a variety of wired communication module, e.g., Controller Area Network (CAN) communication module, Local Area Network (LAN) module, Wide Area Network (WAN) module, or Value Added Network (VAN) module and a variety of cable communication module, e.g., Universal Serial Bus (USB), High Definition Multimedia Interface (HDMI), and Digital Visual Interface (DVI). In addition, the wired communication module may be used to connect the UAV 20 to the vehicle 30 or other components after the UAV 20 lands.

According to an embodiment, the communicator 25 may receive GPS signals from at least three GPS satellites and calculate a current position of the UAV 20 based on the GPS signals and map data.

The communicator 25 may transmit information related to the current position of the UAV 20 on the map to the control center 10, based on a final route received from the control center 10.

The communicator 25 may transmit information acquired by the sensor 22, e.g., images acquired by an image sensor, information on the surrounding condition and the flight information of the UAV 20 detected by other sensors, to the control center 10.

The storage 23 may store information related to the final route that is received by the communicator 25 from the control center 10, and provide the final route to the controller 21 for the flight of the UAV 20.

The storage 23 may store a variety of information collected by the sensor 22 and transmit the information to the control center 10 through the communicator 25.

The storage 23 may represent a storage contained in the UAV 20, but is not limited thereto. The storage 23 may represent an external memory that is separated from the UAV 20.

The storage 23 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage 23 is not limited thereto.

The controller 21 may control the overall operation related to the movement of the UAV 20. For example, as well as the control related to the basic operation of the UAV 20 such as the takeoff, the flight and the attitude control, the controller 21 may control the flight portion 24 so that the UAV 20 lands on a vehicle placed on a vehicle riding route contained in the route, so as to move together with the vehicle.

The controller 21 may provide information related to a departure point and a destination by communicating with the control center 10 and control the flight portion 24 based on a final route transmitted from the control center 10.

The controller 21 may search for or select a detail route in the final route transmitted from the control center 10, based on information related to the surroundings collected by the sensor 22, and the controller 21 may transmit the information related to the surroundings collected by the sensor 22 to the control center 10.

The controller 21 may be implemented using a memory (not shown) storing data related to an algorithm or programs formed by reproducing an algorithm, to control an operation of each component of the UAV 20 and a processor (not shown) performing the above mentioned operation using the data stored in the memory. The memory and the processor may be implemented in separate chips, or a single chip.

The control center 10 may monitor the movement of the above described UAV 20 to control the movement of the UAV 20.

The control center 10 includes a route searcher 11 searching for an optimal route to a destination, based on information related to a departure point and destination transmitted from the UAV 20, a storage 13 storing a variety of data, and a communicator 15 transmitting a selected final routed to the UAV 20.

Particularly, the communicator 15 collects various data from the UAV 20 and the various configurations in the outside, and transmits the final route, which is selected by the route searcher 11, to the UAV 20.

The data collected by the communicator 15 of the control center 10 includes traffic information of the vehicle 30, accident information on a road and weather information in real time, and further include real-time data transmitted from the sensor 22 of the UAV 20.

The communicator 15 includes all of the above-described communication modules for communicating with the UAV 20, and a detailed description of the communication modules will be omitted.

The storage 13 stores geographical information including at least one of map information, altitude information related to the flight, vehicle or pedestrian road link information and terrain feature information, the departure point and the destination information transmitted from the UAV 20, and real-time data transmitted from the communicator 15.

In addition, as well as the geographical information, the storage 13 may store information related to flight regulations and flight restricted zones, information related to the safety of the UAV 20, information related to the capacity of the battery 26 and information related to a variety of routes searched and selected by the route searcher 11.

The storage 13 may include all of the storage media described above, or may be separately provided in a server type.

To select a final route, the route searcher 11 searches for the shortest route based on the departure point information and the destination information, uses the stored data related to the flight restricted zone and the vehicle riding route, and selects a plurality of candidate routes based on a similarity described later.

Finally, the route searcher 11 selects a final route among the plurality of candidate routes based on a travel time to the destination, and an amount of battery consumption that is consumed to reach the destination.

A detailed description of the route search method of the UAV 20 performed by the route searcher 11 will be described later with reference to other drawings.

Figure 3:
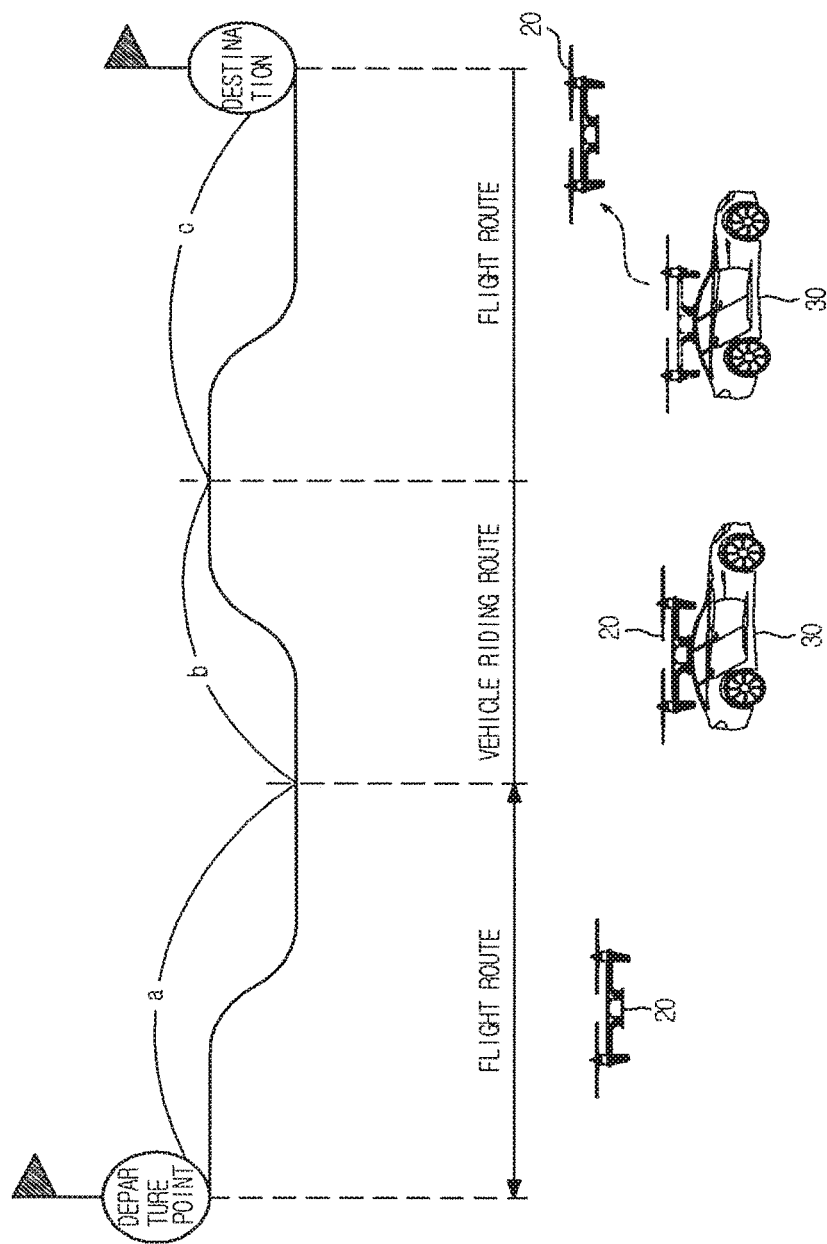
FIG. 3 is a view schematically illustrating a movement of the unmanned aerial vehicle by riding on a vehicle according to an embodiment.

FIG. 3 is a view schematically illustrating a movement of the unmanned aerial vehicle by riding on a vehicle according to an embodiment.

Referring to FIG. 3, according to an embodiment, in order to reach the destination, the UAV 20 may move together with the vehicle 30 by landing on the vehicle 30 placed on a vehicle raiding route (b) among final routes (a, b and c) transmitted from the control center 10.

That is, in order to reach the destination, the UAV 20 may fly in a flight route (section (a)) and move in a vehicle riding route (section (b)) by selecting a landing target vehicle 30 and by landing on the vehicle 30, and fly again in a flight route (section (c)) after taking off from the vehicle 30.

For the movement by riding on the vehicle 30, the UAV 20 may move together with the vehicle 30 by landing on the roof of the vehicle 30 that moves in a direction corresponding to a direction of the destination, on the road corresponding to a part of the flight route.

The UAV 20 may search for an adjacent vehicle 30 through the sensor 22, inquire the vehicle 30 from the control center 10 via the communicator 25, and select the vehicle 30 to ride on. In addition, after the UAV 20 communicates with the vehicle 30 through the communicator 25, the UAV 20 may perform approvals for takeoff or landing.

Figure 4:
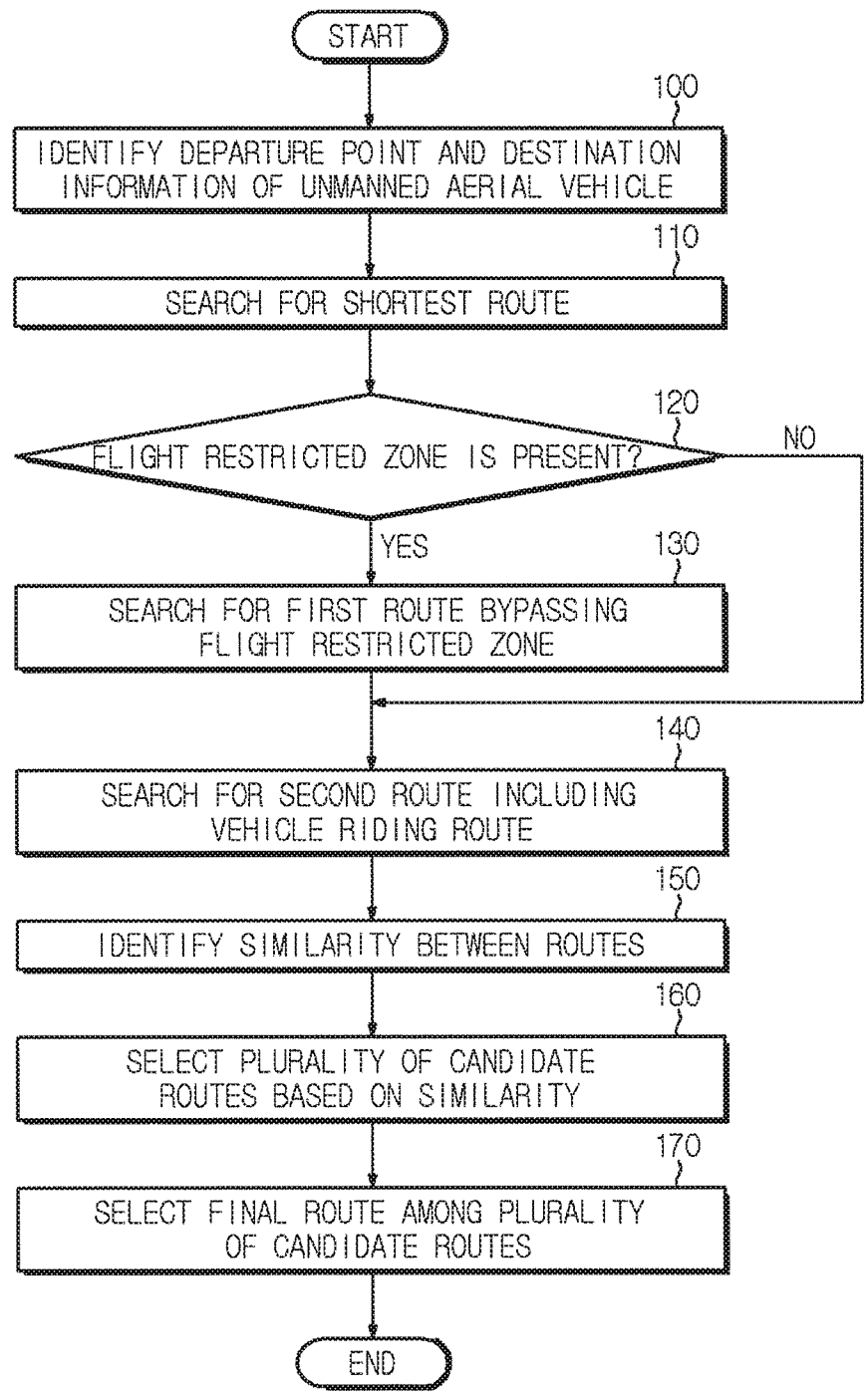
FIG. 4 is a flow chart illustrating a method for searching for a final route according to an embodiment.

FIG. 4 is a flow chart illustrating a method for searching for a final route according to an embodiment, and FIGS. 5A-5G are views illustrating the search method of FIG. 4 displayed on a map. To avoid duplicate description, a description thereof will be described together.

Referring to FIG. 4, the control center 10 identifies information related to the departure point and destination, from the UAV 20 (100).

Figure 5A:
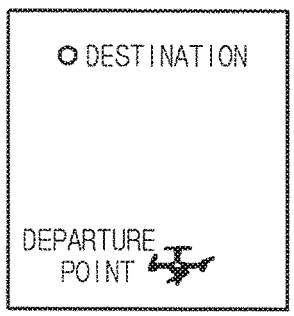
FIGS. 5A-5G are views illustrating the search method of FIG. 4 displayed on a map.
Figure 5B:
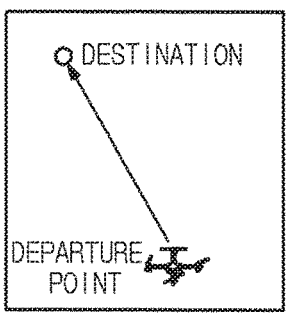

The control center 10 may obtain the map information including the departure point and the destination from the storage 13 and match the departure point and the destination on the map (FIG. 5A).

The departure point and destination information may be received from a user by the UAV 20 or pre-stored by the UAV 20, and the control center 10 may also pre-store the departure point and destination information in advance by communicating with the UAV 20.

Referring again to FIG. 4, the control center 10 searches for the shortest route (110).

For example, a straight route connecting the departure point and the destination (FIG. 5B) may be selected as the shortest route. However, when there is a mountain or building with high altitude between the departure point and the destination, the shortest route may be set as a bypass route.

The control center 10 identifies whether a flight restricted zone is present (120).

Information related to the flight restricted zone may be stored in the control center 10 in advance.

When the flight restricted zone is present, the control center 10 searches for a first route that bypasses the flight restricted zone (130).

Figure 5C:
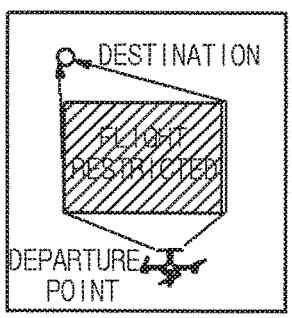

The control center 10 may search for a plurality of first routes bypassing the flight restricted zone (FIG. 5C).

In contrast, when the flight restricted zone is not present on the shortest route, the control center 10 searches for a second route including the vehicle riding route (140).

The vehicle riding route represents a route on which the UAV 20 moves by riding on the vehicle 30 as described above with reference to FIG. 3, wherein the vehicle riding route is set based on the road information contained in the map information. However, it is not required for the vehicle riding route to include the road, and it is enough for the vehicle riding route to include a path on which the vehicle 30 can move.

Figure 5D:
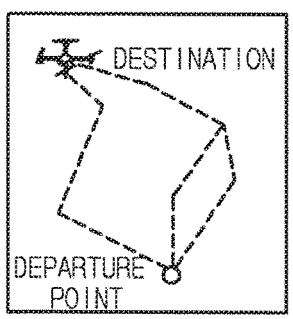

For example, the control center 10 may search for three second routes including the vehicle riding route (FIG. 5D).

The control center 10 identifies the similarity between the searched routes (150).

Figure 5E:
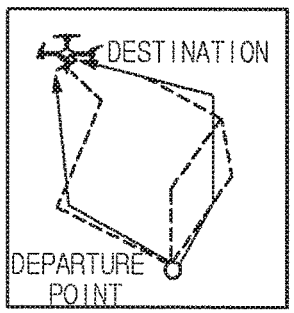

The searched route that is the basis of the similarity identification includes a first route including the flight restricted zone and a second route including the vehicle riding route. In this case, the control center 10 identifies the similarity between the two first routes and the three routes as shown in FIG. 5E.

As another example, when the flight restricted zone is not contained in the shortest route, the control center 10 may identify the similarity based on the shortest route and the second route.

The similarity among routes may be performed by converting a route that is to be compared, into a vector and by using cosine similarity of vector, or by using the Arg MIN function corresponding the sum of distance between points contained in a route, wherein the between points is converted into a line.

Particularly, cosine similarity may be calculated through equation 1 about two vectors (A, B).

$$\text{similarity} = \cos(\theta) = \frac{A \cdot B}{|A|_2 |B|_2} = \frac{\sum_{i=1}^{n} A_i B_i}{\sqrt{\sum_{i=1}^{n} A_i^2} \sqrt{\sum_{i=1}^{n} B_i^2}} \quad \text{[Equation 1]}$$

The similarity using the Arg MIN function may be calculated by equation 2 which calculates the sum of the distances of the points (x, y).

$$\arg\min f(x) := \{x | x \in S \wedge \forall_y \in S: f(y) \geq f(x)\} \quad \text{[Equation 2]}$$

The similarity using the Arg MIN function may be calculated by equation 2 which calculates the sum of the distances of the points (x, y).

The control center 10 selects a plurality of candidate routes based on the similarity (160).

Particularly, the plurality of candidate routes is obtained based on the similarity. For adjusting the complexity, the control center 10 selects top N routes among the plurality of candidate routes. The number of N may be selected through the heuristic method.

Figure 5F:
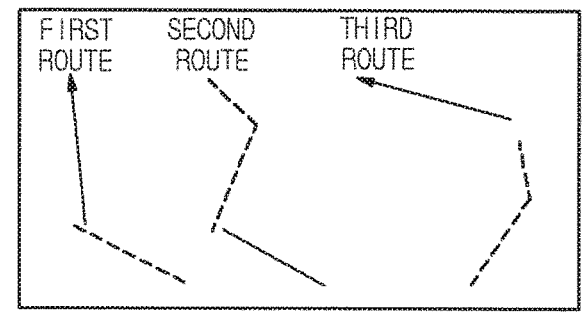

Referring to FIG. 5F, the control center 10 may compare a first route and a second route to select top three candidate routes including an overlapping route, in the order of the similarity wherein a higher priority is given to a high similarity.

Particularly, a first candidate route may be composed of a vehicle riding route at an early stage and a flight section, and a second candidate route may be composed of a flight section at an early stage and a vehicle riding route at a later stage. A third candidate route may be composed of a vehicle riding route that bypassed to the right side and a flight section at a later stage.

The control center 10 selects a final route among the plurality of candidate routed (170).

Figure 5G:
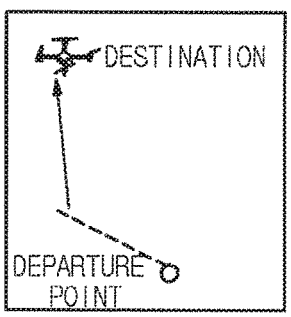

Particularly, the control center 10 selects the final route based on the costs calculated for each of the plurality of selected candidate routes. That is, the control center 10 selects the final route based on a travel time to the destination and the amount of battery consumption to the destination, as shown in FIG. 5G, and a detail description of the selection method will be described with reference to FIG. 6.

Hereinbefore, a subject that searches for and selects the final route has been described as the control center 10, but is not limited thereto. Therefore, the UAV 20 may receive data related to the flight restricted zone and the similarity identification from the control center 10 and select a final route. The UAV 20 that moves along the final route may select a detail route based on the surrounding, by itself.

Figure 6:
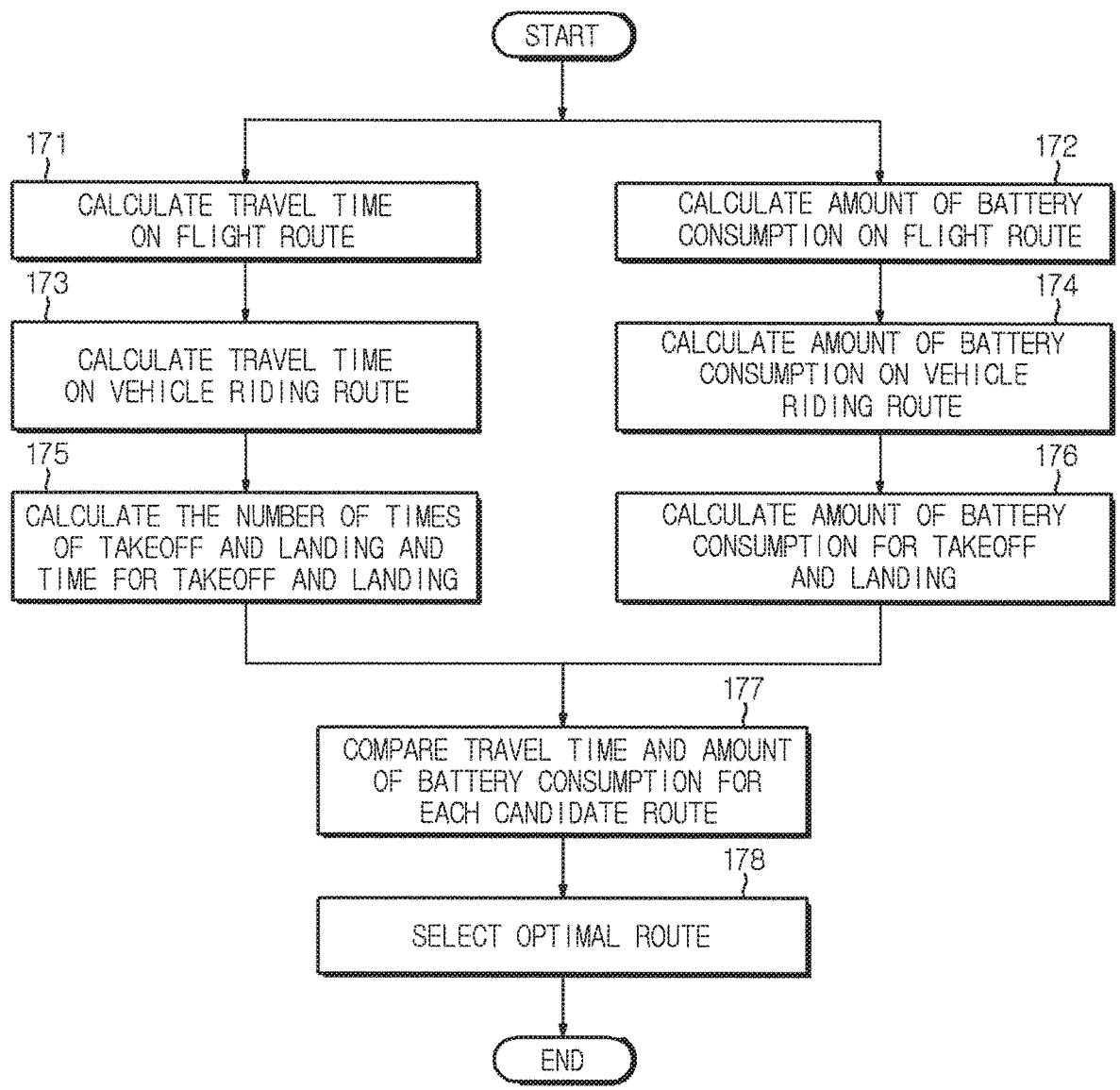
FIG. 6 is a flowchart illustrating a method for selecting a final route according to an embodiment.

FIG. 6 is a flowchart illustrating a method for selecting a final route according to an embodiment.

Referring to FIG. 6, as for the plurality of candidate routes, the control center 10 may calculate the travel time to the destination and the amount of battery consumption to the destination, and selects the optimal candidate route as the final route.

First, the control center 10 calculates a travel time of the flight section contained in the candidate route (171). The travel time is calculated based on the flying speed of the UAV 20 and the distance of the flight section.

In addition, the control center 10 calculates a travel time in the vehicle riding route contained in the candidate route (173).

Particularly, the traffic information is applied to the vehicle riding time in which the UAV 20 moves by riding on the vehicle. That is, the control center 10 may apply the traffic information in real time and the vehicle riding time may be calculated as an average travel speed proportional to a travel distance.

In addition, as for the time in which the UAV 20 moves by riding on the vehicle, the control center 10 calculates an additional time required for landing on or take-off from the vehicle 30 (175).

Particularly, the additional time may be calculated based on the number of times of takeoff and landing, and the time required for takeoff and landing. For example, it may be possible to set a time for taking-off and landing of the UAV 20 as about 10 minutes.

The control center 10 calculates a travel time for each candidate route by integrating the travel time on the above-described flight route, the vehicle riding time, and the additional time required for takeoff and landing.

On the other hand, the control center 10 selects an optimal travel route based on the amount of battery consumption, in addition to the travel time.

First, the control center 10 calculates an amount of battery consumption in the flight route contained in each candidate travel route (172).

Particularly, the amount of battery consumption may be increased as the flight route is longer and the altitude is higher. Based on the map information contained in each candidate route, the control center 10 calculates the amount of battery consumption according to the distance and altitude of the flight route.

In addition, the control center 10 calculates the amount of the battery consumption consumed in the vehicle riding route (174).

When the UAV 20 rides on the vehicle 30 on the vehicle riding route, the UAV 20 may consume the power of the battery 26 for the attitude control. Therefore, the control center 10 calculates the amount of battery consumption in the vehicle riding route based on the vehicle riding time and the average amount of the battery consumption required for the attitude control. On the other hand, the vehicle riding time is based on the traffic information as described above.

The control center 10 may calculate an additional amount of battery consumption required for takeoff and landing of the UAV 20 (176).

Particularly, the additional amount of battery consumption is calculated based on the number of times of takeoff and landing, and the amount of battery consumption required for takeoff and landing. For example, the amount of battery consumption required for takeoff and landing may be preset to 5%.

The control center 10 compares the travel time and the amount of battery consumption calculated for each candidate route (177).

The travel time and the amount of battery consumption calculated for each candidate route may be compared with each other, and a higher priority may be given to the amount of battery consumption rather than the travel time. However, the priority is not limited thereto.

Finally, the control center 10 selects the final route from the candidate routes (178).

That is, the control center 10 may select a candidate route having the least amount of battery consumption among the same ranking candidates within the error range (travel time±5%), as the final route.

FIG. 7 is a flowchart illustrating a method in which the unmanned aerial vehicle according to an embodiment moves to a destination through a final route.

Referring to FIG. 7, the control center 10 and the UAV 20 exchange the departure point and destination information (200).

The UAV 20 may transmit the departure point and destination information to the communicator 15 of the control center 10 through the communicator 25. Alternatively, a user of the UAV 20 may transmit the departure point and destination information to the control center 10 through a user terminal.

The UAV 20 receives the final route selected by the control center 10 and selects a detailed route based on the surrounding information collected through the sensor 22 (210).

As illustrated in FIG. 6, the final route transmitted by the control center 10 may be a route including a flight route and a vehicle riding route. Therefore, based on the information on the surrounding situation transmitted by the sensor 22, the UAV 20 may generate an optimal route (hereinafter referred to as a detail route) by using the received final route.

The UAV 20 performs takeoff and flight based on the generated detailed travel route (220).

During flight, the UAV 20 identifies whether the UAV 20 enters the vehicle riding route (230).

Particularly, the UAV 20 may identify whether the UAV 20 enters the vehicle riding route based on the GPS information transmitted by the sensor 22 and the final route stored in the storage 23.

When the UAV 20 does not enter the vehicle riding route, the UAV 20 continues to fly (280).

In contrast, when the UAV 20 enters the vehicle riding route, the UAV 20 may search for a position of the vehicle 30 and select the vehicle 30 to ride on (240).

For example, the UAV 20 may search for the vehicle 30 through the image sensor contained in the sensor 22. Alternatively, the UAV 20 may search for the vehicle 30 by receiving information related to the vehicle 30 corresponding to a landing object, from the control center 10.

The UAV 20 may communicate with the searched vehicle 30 and receive data related to an identification number and whether the vehicle is currently stopped, so as to select the vehicle 30 to ride on.

When the vehicle 30 to ride on is selected, the UAV 20 moves to the selected vehicle 30 and then lands on the vehicle 30 (250)

Particularly, the UAV 20 identifies whether the selected vehicle 30 is moving or stopped.

When the selected vehicle 30 is moving, the UAV 20 may receive information related to a traveling speed of the vehicle 30 and regulate a flying speed through the flight portion 24.

Further, when the UAV 20 lands, the UAV 20 may select a flat position, such as a roof of the vehicle 30 and land on the flat position.

When the UAV 20 lands on the vehicle 30, the UAV 20 moves using the movement of the vehicle 30 (260). In addition, the UAV 20 re-searches for its position in real time to select a take-off point while moving by riding on the vehicle 30.

When the vehicle 30 escapes from the route without reaching the vehicle riding section, the UAV 20 may take off and search for another vehicle 30 to ride on.

In contrast, when the vehicle 30 reaches an end point of the vehicle riding section, the UAV 20 may determine to take off (270) and fly on the flight section (280).

As is apparent from the above description, according to the proposed unmanned aerial vehicle, a system having the same and a method for searching for a route of the unmanned aerial vehicle, it may be possible to increase a short travel distance caused by the limitation in the battery capacity and efficiently use power of the battery.

According to the disclosed embodiment, it may be possible to secure the safe flying and avoid the flight restricted zone by the movement by riding on the vehicle.

In addition, according to the disclosed embodiment, it may be possible to provide an unmanned aerial vehicle securing the safety from the risk of collision and being used in various fields, by scheduling of a plurality of unmanned aerial vehicles.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A route searching system comprising:
an unmanned aerial vehicle; and
a control center configured to:
search for a shortest route based on information on a departure point and a destination received from the unmanned aerial vehicle, and
select a final route based on a first similarity between the shortest route and a vehicle riding route,
wherein the control center calculates an amount of battery consumption to the destination, based on an amount of battery consumption for landing on or taking off from a vehicle and an amount of battery consumption for flight of the unmanned aerial vehicle.

2. The system of claim 1, wherein the unmanned aerial vehicle receives the final route through a communication with the control center and lands on the vehicle placed on the vehicle riding route contained in the final route to move along with the vehicle.

3. The system of claim 1, wherein the control center identifies whether a flight restricted zone is present in the shortest route, and searches for a first route that bypasses the flight restricted zone.

4. The system of claim 3, wherein the control center searches for a second route including the vehicle riding route, and selects a plurality of candidate routes based on a second similarity between the first route and the second route.

5. The system of claim 4, wherein the control center selects the final route from the selected plurality of candidate routes, based on a travel time to the destination and the amount of battery consumption to the destination.

6. The system of claim 5, wherein the control center calculates the travel time to the destination, based on an additional time for landing on or taking off from the vehicle and a vehicle riding time for moving by riding on the vehicle.

7. The system of claim 1, wherein a number of the candidate routes is calculated by a heuristic.

8. A method for searching for a route of an unmanned aerial vehicle, the method comprising steps of:
searching for a shortest route based on information on a departure point and a destination;
selecting a final route based on a first similarity between the shortest route and a vehicle riding route;
landing on a vehicle placed on the vehicle riding route contained in the selected final route, and moving together with the vehicle; and
calculating an amount of battery consumption to the destination, based on an amount of battery consumption for landing on or taking off from the vehicle and an amount of battery consumption for flight of the unmanned aerial vehicle.

9. The method of claim 8, further comprising:
identifying whether a flight restricted zone is present in the shortest route; and
searching for a first route that bypasses the flight restricted zone.

10. The method of claim 9, further comprising:
searching for a second route including the vehicle riding route; and
selecting a plurality of candidate routes based on a second similarity between the first route and the second route.

11. The method of claim 10, wherein the step of selecting a plurality of candidate routes comprises selecting the final route from the selected plurality of candidate routes, based on a travel time to the destination and the amount of battery consumption to the destination.

12. The method of claim 10, wherein the step of selecting a plurality of candidate routes comprises calculating the number of the candidate routes by the heuristic method.

13. The method of claim 9, further comprising calculating a travel time to the destination, based on an additional time for landing on or taking off from the vehicle and a vehicle riding time for moving by riding on the vehicle.

14. An unmanned aerial vehicle comprising:
a battery;
a flight portion configured to use power of the battery;
a communicator configured to perform a communication with a control center; and
a controller configured to:
receive information on a departure point and a destination from the control center through the communicator, and
control the flight portion to allow the unmanned aerial vehicle to land on a vehicle placed on a vehicle riding route contained in a final route received from the control center,
wherein the control center calculates an amount of battery consumption to the destination, based on an amount of battery consumption for landing on or taking off from the vehicle and an amount of battery consumption for flight of the unmanned aerial vehicle.

15. The unmanned aerial vehicle of claim 14, further comprising a sensor configured to collect information related to surroundings,
wherein the controller selects a detail route based on the information collected by the sensor and the final route.

16. The unmanned aerial vehicle of claim 15, wherein the controller controls the flight portion to allow the unmanned aerial vehicle to land on the vehicle by identifying whether the unmanned aerial vehicle enters the vehicle riding route.

17. The unmanned aerial vehicle of claim 16, wherein the controller controls the flight portion to allow the unmanned aerial vehicle to take off from the vehicle by identifying whether the unmanned aerial vehicle enters a flight route contained in the final route.

18. A route searching system comprising:
an unmanned aerial vehicle; and
a control center configured to:
  search for a shortest route based on information on a departure point and a destination received from the unmanned aerial vehicle; and
  select a final route based on a first similarity between the shortest route and a vehicle riding route,
wherein the first similarity comprises a cosine similarity between the shortest route and the vehicle riding route corresponding to comparisons, or an argument of the minimum (Arg MIN) function based on a sum of distances of the shortest route and the vehicle riding route.

19. A method for searching for a route of an unmanned aerial vehicle, the method comprising steps of:
searching for a shortest route based on information on a departure point and a destination;
selecting a final route based on a first similarity between the shortest route and a vehicle riding route; and
landing on a vehicle placed on the vehicle riding route contained in the selected final route, and moving together with the vehicle,
wherein the first similarity comprises a cosine similarity between the shortest route and the vehicle riding route corresponding to comparisons, or an Arg MIN function based on a sum of distances of the shortest route and the vehicle riding route.

* * * * *